(12) United States Patent
Hoole (10) Patent No.: US 8,406,777 B2
(45) Date of Patent: Mar. 26, 2013

(54) SYSTEMS AND METHODS OF DYNAMIC SEGREGATION OF MANAGED WIRELESS RESOURCES BY TRAFFIC TYPE

(75) Inventor: Elliott Hoole, Sammamish, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 311 days.

(21) Appl. No.: 12/711,150

(22) Filed: Feb. 23, 2010

(65) Prior Publication Data

US 2010/0216482 A1    Aug. 26, 2010

Related U.S. Application Data

(60) Provisional application No. 61/155,103, filed on Feb. 24, 2009.

(51) Int. Cl.
*H04W 72/00* (2009.01)
*H04W 36/00* (2009.01)

(52) U.S. Cl. ............... 455/450; 455/436; 455/456.1

(58) Field of Classification Search ............ 455/436, 455/456.1, 435.1, 550.1, 440; 370/468, 335, 370/254, 328, 331
See application file for complete search history.

(56) References Cited

U.S. PATENT DOCUMENTS

| | | | |
|---|---|---|---|
| 7,218,630 B1 | 5/2007 | Rahman | |
| 2002/0003809 A1* | 1/2002 | Hierholzer et al. | 370/468 |
| 2008/0039089 A1* | 2/2008 | Berkman et al. | 455/436 |
| 2008/0117891 A1 | 5/2008 | Damnjanovic et al. | |
| 2009/0296641 A1* | 12/2009 | Bienas et al. | 370/329 |
| 2010/0085945 A1* | 4/2010 | Williams | 370/336 |
| 2010/0167742 A1* | 7/2010 | Rajagopalan et al. | 455/436 |

FOREIGN PATENT DOCUMENTS

| | | |
|---|---|---|
| KR | 10-2003-0052826 A | 6/2003 |
| KR | 10-2008-0010907 A | 1/2008 |

OTHER PUBLICATIONS

International Search Report and Written Opinion for PCT/US2010/025106 filed on Feb. 23, 2010.

* cited by examiner

*Primary Examiner* — Kiet Doan (57) ABSTRACT

Systems and methods are described for segregating airlink resources in a wireless communication network by traffic type. When voice data and traffic data are sent simultaneously in a wireless network using a limited set of frequency resources, the data traffic can cause unacceptable interference in the voice traffic. Accordingly, transceivers share their voice traffic and data traffic demands and may allocate portions of an airlink resource into resource zones for exclusive use by voice traffic and data traffic. Within each resource zone, the transmission can be optimally managed for each traffic type, and interference between voice traffic and data traffic is reduced.

17 Claims, 10 Drawing Sheets

SYSTEMS AND METHODS OF DYNAMIC SEGREGATION OF MANAGED WIRELESS RESOURCES BY TRAFFIC TYPE

CROSS REFERENCE TO RELATED APPLICATIONS

The present application claims the benefit of U.S. Provisional Application No. 60/155,103, filed Feb. 24, 2009, which is incorporated herein by reference.

FIELD OF THE INVENTION

The field of the present invention generally relates to systems and methods of dynamic segregation of managed resources by traffic type. Voice traffic and data traffic in a wireless communication system may be separated into resource zones, leading to lower interference levels and to generally higher network efficiency.

BACKGROUND OF THE INVENTION

Modern wireless communication networks include many different network topologies comprising heterogeneous mixtures of macrocell, microcell, picocell, and femtocell resources. At the highest level of wireless coverage, a macrocell provides cellular service for a relatively large physical area, often in areas where network traffic densities are low. In more dense traffic areas, a macrocell may act as an overarching service provider, primarily responsible for providing continuity for service area gaps between smaller network cells. In areas of increased traffic density, microcells are often utilized to add network capacity and to improve signal quality for smaller physical areas where increased bandwidth is required. Numerous picocells and femtocells generally add to network capacity for even smaller physical areas in highly populated metropolitan and residential regions of a larger data communications network.

As would be understood by those skilled in the Art, in all wireless service provider networks, macrocells typically provide the largest wireless coverage area for licensed frequency spectra, followed by microcells, then picocells, and lastly femtocells. By way of example, in a typical wireless data communications network, a macrocell base station may provide a wireless coverage area ranging between one to five kilometers, radially from the center of the cell; a microcell base station may provide a coverage area ranging between one-half to one kilometer radially; a picocell base station may provide a coverage area ranging between 100 to 500 meters radially; and a femtocell base station may provide a coverage area of less than 100 meters radially. Each of these network cells or base station types are generally configured to connect with a particular service provider network using various common wireline communications technologies, including, but not limited to: fiber optic, twisted pair, powerline, and/or coaxial cable (i.e., joining cells to a backhaul network).

This mixture of larger and smaller cells can reduce periods of network congestion created by traditional network architecture which previously bottlenecked a majority of regional subscriber communications through a small number of larger network cells (e.g., macrocells or microcells). This congestion reducing technique can improve a service provider network's Quality of Service (QOS) as well as network service subscribers' collective Quality of Experience (QOE) within a particular portion of a data communications network. Negative effects associated with poor QOS and poor QOE (e.g., conditions largely caused by congestion and/or interference), which can be mitigated by adding a substantial number of short-range wireless transceiver devices to network infrastructure, may include: queuing delay, data loss, as well as blocking of new and existing network connections for certain network subscribers.

As the number of overlapping cells in a network increases (i.e., the number of macrocells, microcells, picocells, and femtocells in a network), it becomes increasingly important to manage the airlink resources shared by the components in a network. By way of example, resources such as frequency channels, timeslots, and spreading codes need to be managed for each cell in a network, and often it is advantageous to manage voice traffic and data traffic separately to increase overall network efficiency.

Managing voice traffic presents two difficulties when compared to managing data traffic. First, voice traffic is less robust than data traffic, and second, errors affecting voice traffic are often more noticeable than errors affecting data traffic. More specifically, subscribers expect a high QOS and QOE with voice communications, although this is often difficult to deliver because voice traffic is sensitive to delay and packet errors. Because voice traffic is a streaming traffic type, one method of controlling interference levels may be to use a closed-loop power control system. One type of closed-loop algorithm may constantly monitor an uplink transmission from a subscriber device and vary the power level of a downlink channel to an optimum power level. This may allow voice traffic to be transmitted at a lower power level, thereby reducing interference with other resources in adjacent cells within the system. However, as the nature of the traffic transitions from streaming to burst transmissions, the closed-loop power control algorithm becomes less effective and interference levels may increase.

In contrast to voice traffic, data traffic is bursty in nature and closed-loop power control algorithms cannot typically be used to control power levels while transmitting data traffic, leading to greater levels of interference in neighboring cells. Additionally, data traffic is less sensitive than voice traffic to delay and can tolerate packet errors since retransmission is used to correct for lost packets. Given the more robust nature of data traffic and the less effective response to some power control algorithms, it would be advantageous to manage data traffic differently than voice traffic to reduce interference levels and to increase system efficiency.

Without effective wireless resource management, data traffic in one cell could create interference issues with voice traffic in an adjacent cell because voice traffic is more susceptible than data traffic to errors in a wireless network. Thus, it is desirable if the resources used for these types of traffic in a network of cells could be coordinated in resource zones such that all cells used similar sets of resources for each type of traffic.

Prior art systems have attempted to manage network traffic through network planning and by pre-provisioning sets of resources for each cell in a network. These centrally-planned networks have managed frequency channels, timeslots, and spreading codes, but efficiency suffers as the provisioning may be conservative and may not react effectively to actual traffic requirements. Alternatively, prior art systems using packetized voice traffic and data traffic have managed resources in an ad hoc manner without differentiating between the traffic types leading to the aforementioned interference issues. Thus, it would be desirable for cells to negotiate between themselves for the resources they need from within sets of resources that have significant, if not complete, overlap between cells thereby, controlling interference levels and resulting in a more efficient resource utilization than a planned and managed scheme would yield.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with interference issues caused by concurrent transmissions of data traffic and voice traffic, systems and methods are described herein for dynamic segregation of managed wireless resources by type.

The present invention may include a wireless communication system for allocating an airlink resource, comprising: a first transceiver device; a second transceiver device; at least one user equipment; a server computer; and a data communication network facilitating data communication amongst the first transceiver device, the second transceiver device, the at least one user equipment, and the server computer, wherein the system is configured to: consider resource demand information; generate an allocation plan by separating the airlink resource into a voice resource zone and a data resource zone based on the considered resource demand information; and implement the allocation plan in the wireless communication system.

In accordance with another aspect of the present invention, the resource demand information is a traffic requirement for at least one network transceiver device.

In accordance with another aspect of the present invention, a size of the voice resource zone and a size of the data resource zone varies dynamically according to a traffic requirement of at least one network cell.

In accordance with another aspect of the present invention, the airlink resource comprises at least one frequency resource and at least one time resource, the voice resource zone comprises all of the frequency resources and a first portion of the time resource, and the data resource zone comprises all of the frequency resources and a second portion of the time resource.

In accordance with another aspect of the present invention, implementing the allocation plan reduces an interference level between voice communication traffic and data communication traffic.

In accordance with another aspect of the present invention, the resource demand information comprises a voice resource demand and a data resource demand for the first transceiver device and the second transceiver device.

In accordance with another aspect of the present invention, considering the resource demand information comprises: transmitting a first resource demand information of the first transceiver to the server computer; and transmitting a second resource demand information of the second transceiver to the server computer.

The present invention may further include a computer-implemented method for managing an airlink resource in a wireless communication system, comprising: considering resource demand information; generating an allocation plan by separating the airlink resource into a voice resource zone and a data resource zone based on the considered resource demand information; and implementing the allocation plan in the wireless communication system.

The present invention may further include a computer readable medium encoded with computer-executable instructions for managing an airlink resource in a wireless communication system, which when executed, performs a method comprising: considering resource demand information; generating an allocation plan by separating the airlink resource into a voice resource zone and a data resource zone based on the considered resource demand information; and implementing the allocation plan in the wireless communication system.

The present invention may further include a transceiver device for managing an airlink resource for wireless communications, comprising: at least one memory; and at least one processor operatively coupled to the memory, wherein the transceiver device is configured to: consider resource demand information; generate an allocation plan by separating the airlink resource into a voice resource zone and a data resource zone based on the consider resource demand information; and implement the allocation plan in a wireless communication system.

BRIEF DESCRIPTION OF THE DRAWINGS

Preferred and alternative examples of the present invention are described in detail below by way of example and with reference to the drawings, in which.

DETAILED DESCRIPTION

Figure 1:
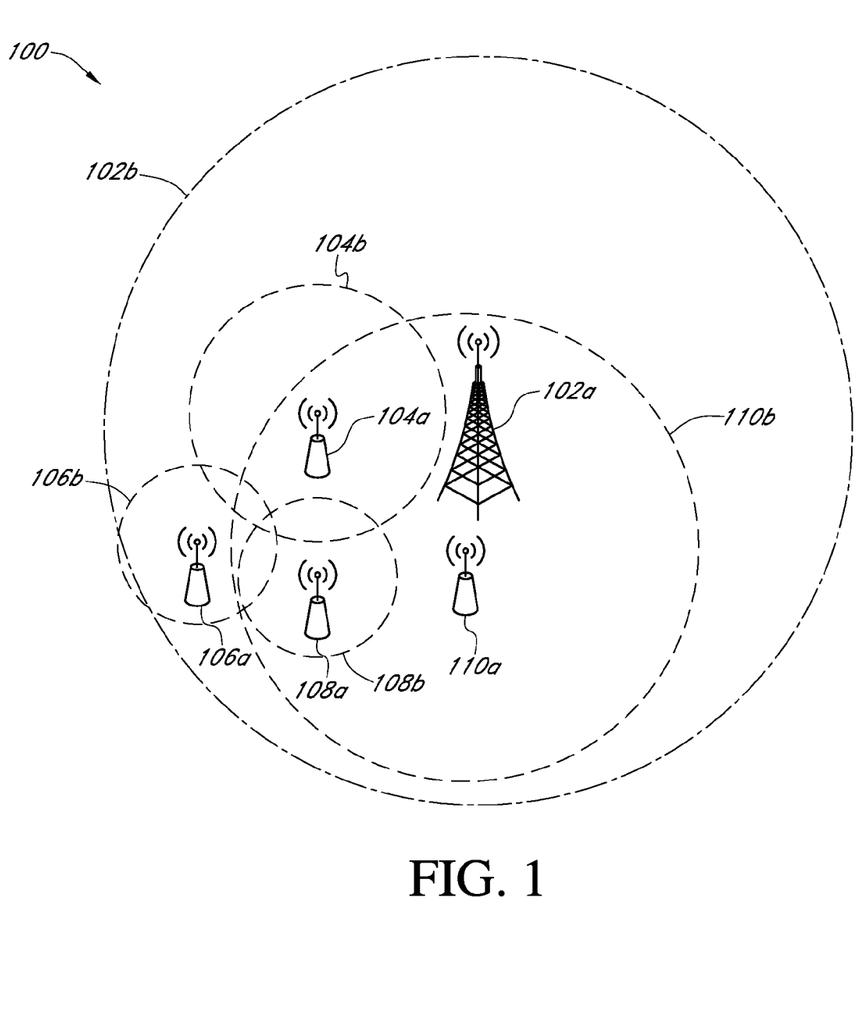
FIG. 1 illustrates a network topology comprising various base stations as a part of a larger data communications network in accordance with an embodiment of the present invention.

In accordance with an exemplary embodiment of the present invention, FIG. 1 illustrates a generic cell topology 100 depicting cell coverage regions resulting from extemporaneous deployment methodology. The generic cell topology 100 may include, but is not limited to, one or more macrocell base stations 102a with a corresponding coverage area 102b, and one or more intermediate-coverage base stations such as a microcell 110a and a picocell 104a base station with corresponding coverage areas 110b and 104b. Generic cell topology 100 further includes several femtocell base stations 106a and 108a, each with a corresponding coverage area 106b and 108b. Cell coverage areas 102b, 104b, 106b, 108b, and 110b overlap in varying degrees according to their placement in the generic cell topology 100. This tightly knit cell topology necessitates a resource allocation plan which is addressed by the present invention.

In accordance with various embodiments of the present invention, a wide-area or wide-range base station (e.g., base station 102a) may be considered to be any of a macrocell, a microcell, or a picocell base station, depending on the reference coverage area provided by the small-area or short-range wireless transceiver device(s) (e.g., a femtocell or a picocell device) to which the base station coverage area is being compared. Similarly, in accordance with various embodiments of the present invention, a small-area or short-range wireless transceiver device (e.g., base stations 104a, 106a, 108a, and 110a) may be considered to be either a femtocell (e.g., a short-range base station device such as a Home eNodeB), a picocell, or a microcell, depending on the reference coverage area provided by neighboring wider coverage area base stations (e.g., macrocell, microcell, or picocell base stations) to which the transceiver device coverage area is being compared.

Figure 2:
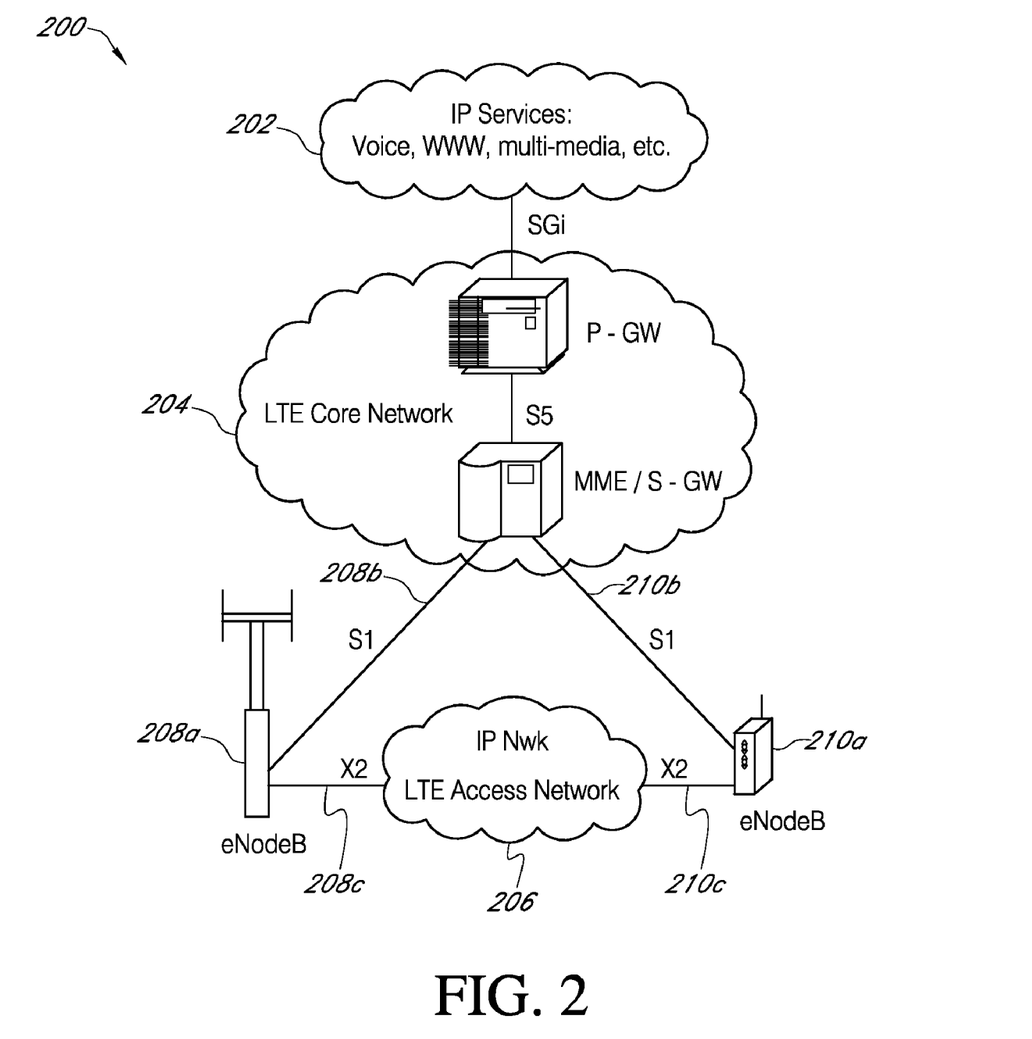
FIG. 2 illustrates various communication paths and networks between wireless base stations in accordance with an embodiment of the present invention.

FIG. 2 illustrates a network architecture 200 with various common communication paths and networks between wireless base stations in accordance with an embodiment of the present invention. The base stations 208a and 210a depicted in FIG. 2 may be representative of the base stations 104a, 106a, and 108a depicted in FIG. 1. In an embodiment, the network architecture 200 may be consistent with a LTE network topology, while other specific topologies may be utilized dependent on the chosen mobile standards such as GSM or UMTS. In particular, the network architecture 200 depicts two eNodeB base stations 208a and 210a in a 3GPP LTE (Third Generation Partnership Project Long Term Evolution) access network, which may architecturally be considered to be femtocells. Base stations 208a and 210a may communicate with each other via an X2 interface 208c and 210c using an IP network 206. Base stations 208a and 210a may exchange information regarding their radio resource usage including a voice resource demand and a data resource demand. Other communications between base stations 208a and 210a may take place over the X2 interface as defined in the 3GPP LTE interface.

Base stations 208a and 210a interface with the Evolved Packet Core (EPC) network 204 using S1 connections 208b and 210b. Additionally, base stations 208a and 210a may use the S1 connections 208b and 210b to communicate resource demand information with a macrocell, microcell, picocell, or central server. The EPC network 204 further includes: a Serving Gateway (S-GW) which routes and forwards user data packets as well as facilitates handovers; a Mobility Management Entity (MME) which acts as a key control node for user equipment tracking and authentication; and a Packet Data Network Gateway (P-GW), which performs policy enforcement, packet filtering for each user, charging support, and/or lawful interception and packet screening. Network architecture 200 also includes an IP network 202 providing access to the Internet, voice, multimedia, etc. The P-GW may interface with the MME/S-GW using the S5 interface, while SGi provides a reference point between the P-GW and the IP network 202.

Figure 3:
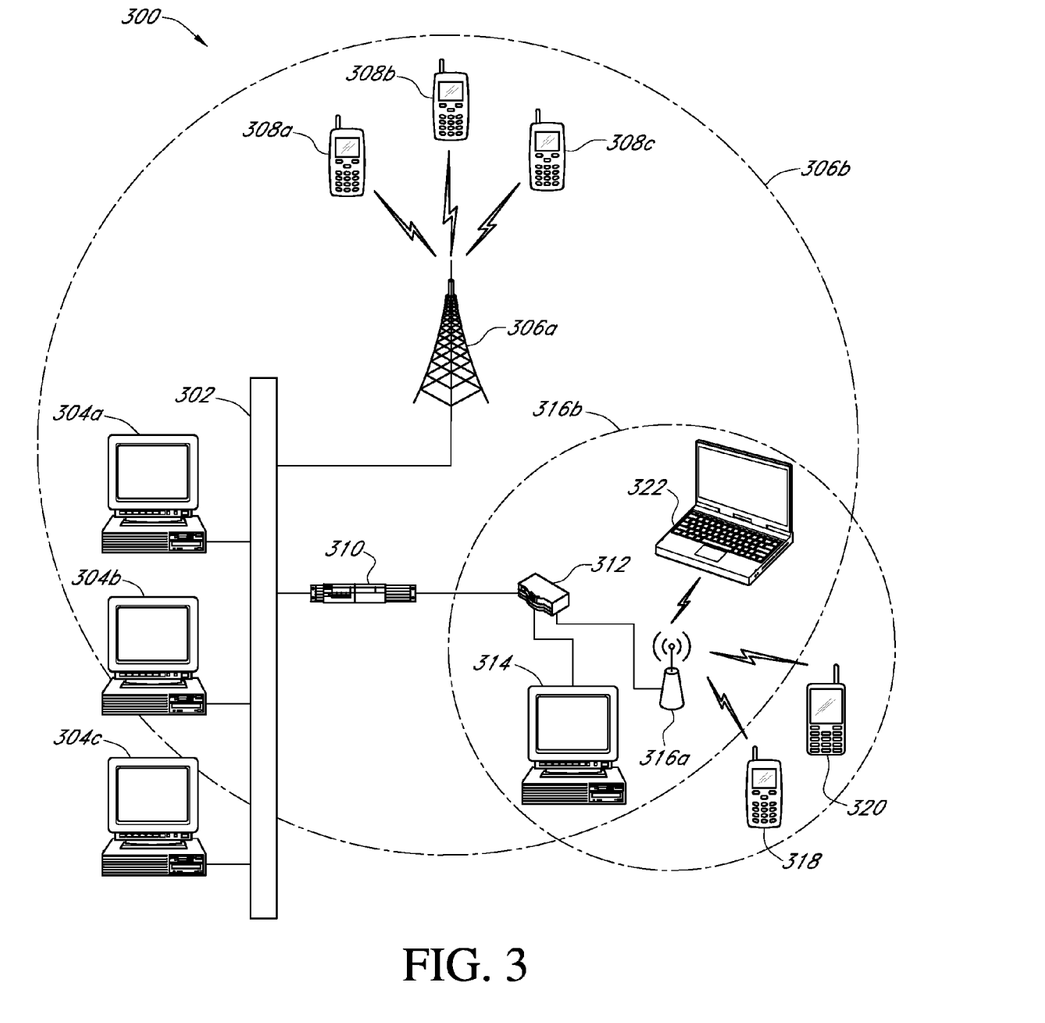
FIG. 3 illustrates a perspective view of a networked computing system in accordance with an embodiment of the present invention.

FIG. 3 illustrates a perspective view of a networked computing system 300 including various wireline and wireless computing devices that may be utilized to implement any of the resource allocation processes associated with various embodiments of the present invention. The networked computing system 300 may include, but is not limited to, one or more remote base station devices 306a, which may be associated with a macrocell, a microcell, or a picocell base station that may be a neighboring base station to one or more short-range transceiver devices 316a (e.g., a femtocell or picocell device) within a particular region of the networked computing system 300; a group of remote service provider devices 304a-c, including server computers or any other common network device known in the art such as routers, gateways, or switch devices, which can support network resource allocation and/or digital data communication services to various network subscriber computing devices (e.g., any of the devices 308a-c, 310, 312, 314, 316a, 318, 320, and 322); a data communications network 302, including both Wide Area Network 306b (WAN), and Local Area Network 316b (LAN) portions; a variety of wireless user equipment, including: cellular phone or PDA devices 308a-c, 318 and 320, and a laptop or netbook computer 322, along with any other common portable wireless computing devices well known in the art (e.g., handheld gaming units, personal music players, video recorders, electronic book devices, etc.) that are capable of communicating with the data communications network 302 utilizing one or more of the remote base stations 306a, the short-range transceiver device 316a, or any other common wireless or wireline network communications technology; one or more network gateways or switch devices 310 and router 312 that can facilitate data communications processes within the LAN and between the LAN and the WAN of the data communications network 302; and a desktop computer 314 optionally connected to the LAN.

In an embodiment, remote base station 306a may be representative of the base stations 102a and 110a in FIG. 1, while the short-range transceiver device 316a may be representative of the base stations 104a, 106a, and 108a in FIG. 1 and base stations 208a and 210a in FIG. 2. While FIG. 3 only illustrates one short-range transceiver device 316a, it may be apparent that the networked computing system 300 may include multiple base stations similar to the topology in FIG. 1. Additionally, data communications network 302 may correspond to networks 202, 204, and 206 in FIG. 2, while remote service provider devices 304a-c may correspond with the P-GW and/or the MME/S-GW of FIG. 2.

In an embodiment, the remote base station 306a, the short-range transceiver device 316a (e.g., a femtocell or picocell base station), the remote service provider devices 304a-c, or any of the user equipment (e.g., 308a-c, 314, 318, 320, or 322) may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, the remote base station 306a may employ any number of common server, desktop, laptop, and personal computing devices.

In an embodiment, the user equipment (e.g., 308a-c, 314, 318, 320, or 322) may include any combination of common mobile computing devices (e.g., laptop computers, netbook computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, Wi-Max™, Wi-Fi™, etc.

In an embodiment, either of the LAN or the WAN portions of the data communications network 302 of FIG. 3 may employ, but are not limited to, any of the following common communications technologies: optical fiber, coaxial cable, twisted pair cable, Ethernet cable, and powerline cable, along with any wireless communication technology known in the art. In an embodiment, the remote wireless base station 306a, the wireless user equipment (e.g., 308a-c, 318, 320, or 322), as well as any of the other LAN connected computing devices (e.g., 310, 312, or 314) may include any standard computing software and hardware necessary for processing, storing, and communicating data amongst each other within the networked computing system 300. The computing hardware realized by any of the network computing system 300 devices (e.g., 304a-c, 306a, 308a-c, 310, 312, 314, 316a, 318, 320, or 322) may include, but is not limited to: one or more processors, volatile and non-volatile memories, user interfaces, transcoders, modems, and wireline and/or wireless communications transceivers, etc.

Further, any of the networked computing system 300 devices (e.g., 304a-c, 306a, 308a-c, 310, 312, 314, 316a, 318, 320, or 322) may be configured to include one or more computer-readable media (e.g., any common volatile or non-volatile memory type) encoded with a set of computer readable instructions, which when executed, performs a portion of any of the resource allocation processes associated with various embodiments of the present invention.

In an embodiment, user equipment (e.g., 308a-c, 318, 320, and 322) may simultaneously reside within the wireless communications coverage area 316b of the short-range transceiver device 316a as well as within the wireless communications coverage area 306b of the base station 306a, or the user equipment may reside in a single, non-overlapping area of LAN 316b or WAN 306b.

Figure 4:
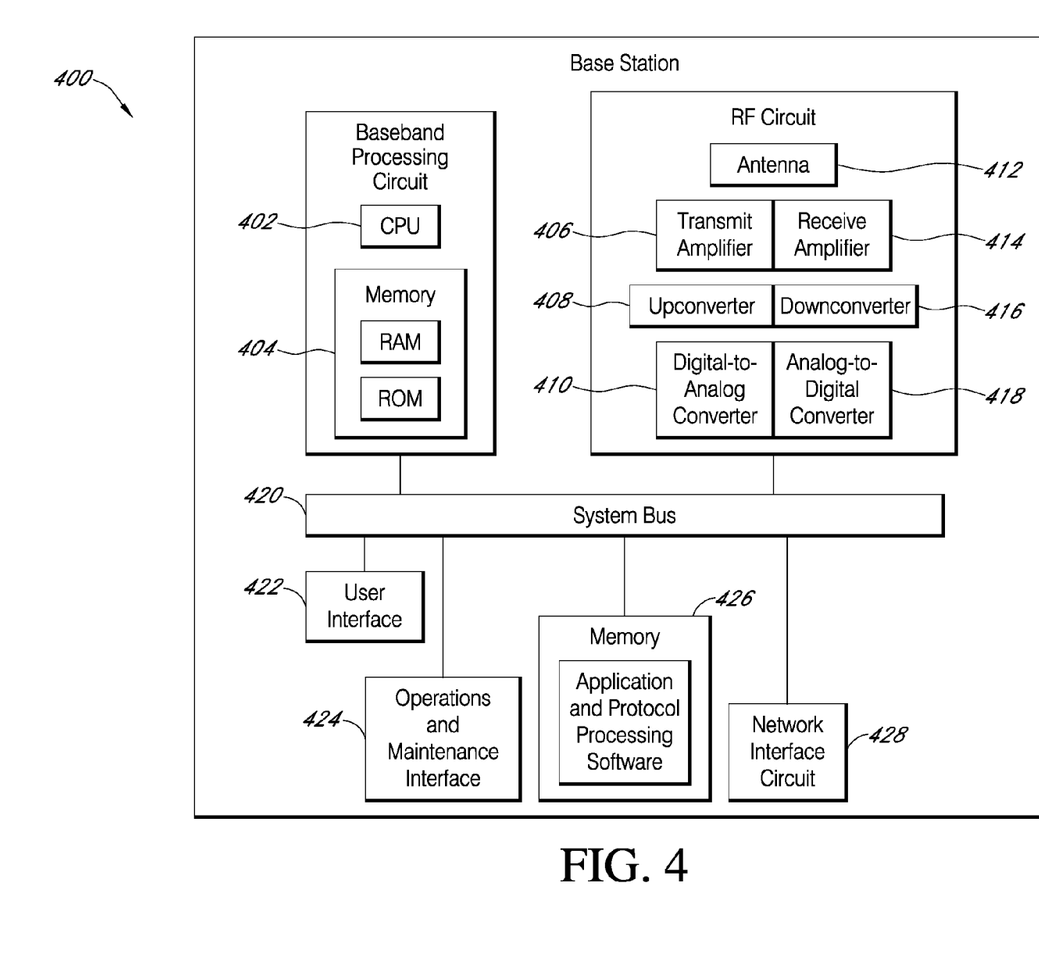
FIG. 4 illustrates a block diagram view of a base station in accordance with an embodiment of the present invention.

FIG. 4 illustrates a block diagram view of a base station device 400 (e.g., a femtocell or a picocell device) that may be representative of the base stations 104a, 106a, and 108a in FIG. 1, the base stations 208a and 210a in FIG. 2, and the short-range transceiver device 316a in FIG. 3. In accordance with an embodiment of the present invention, the base station device 400 may include, but is not limited to, a baseband processing circuit including at least one central processing unit (CPU) 402. In an embodiment, the CPU 402 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 402 is responsible for executing all computer programs stored on the transceiver device's 400 volatile (RAM) and nonvolatile (ROM) system memories, 404 and 426.

The base station device 400 may also include, but is not limited to, a radio frequency (RF) circuit for transmitting and receiving data to and from the network. The RF circuit may include, but is not limited to, a transmit path including a digital-to-analog converter 410 for converting digital signals from the system bus 420 into analog signals to be transmitted, an upconverter 408 for setting the frequency of the analog signal, and a transmit amplifier 406 for amplifying analog signals to be sent to the antenna 412. Further, the RF circuit may also include, but is not limited to, a receive path including the receive amplifier 414 for amplifying the signals received by the antenna 412, a downconverter 416 for reducing the frequency of the received signals, and an analog-to-digital converter 418 for outputting the received signals onto the system bus 420. The system bus 420 facilitates data communication amongst all the hardware resources of the base station device 400.

Further, the base station device 400 may also include, but is not limited to, a user interface 422; operations and maintenance interface 424; memory 426 storing application and protocol processing software; and a network interface circuit 428 facilitating communication across the LAN and/or WAN portions of the data communications network 302 or networks 202, 204, and 206 (i.e., a backhaul network).

In accordance with an embodiment of the present invention, the base station 400 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 400 may be configured to communicate with the subscriber devices (e.g., 308a-c, 318, 320, and 322) via any Cellular Data Communications Protocol, including any common GSM, UMTS, WiMAX or LTE protocol.

Figure 5:
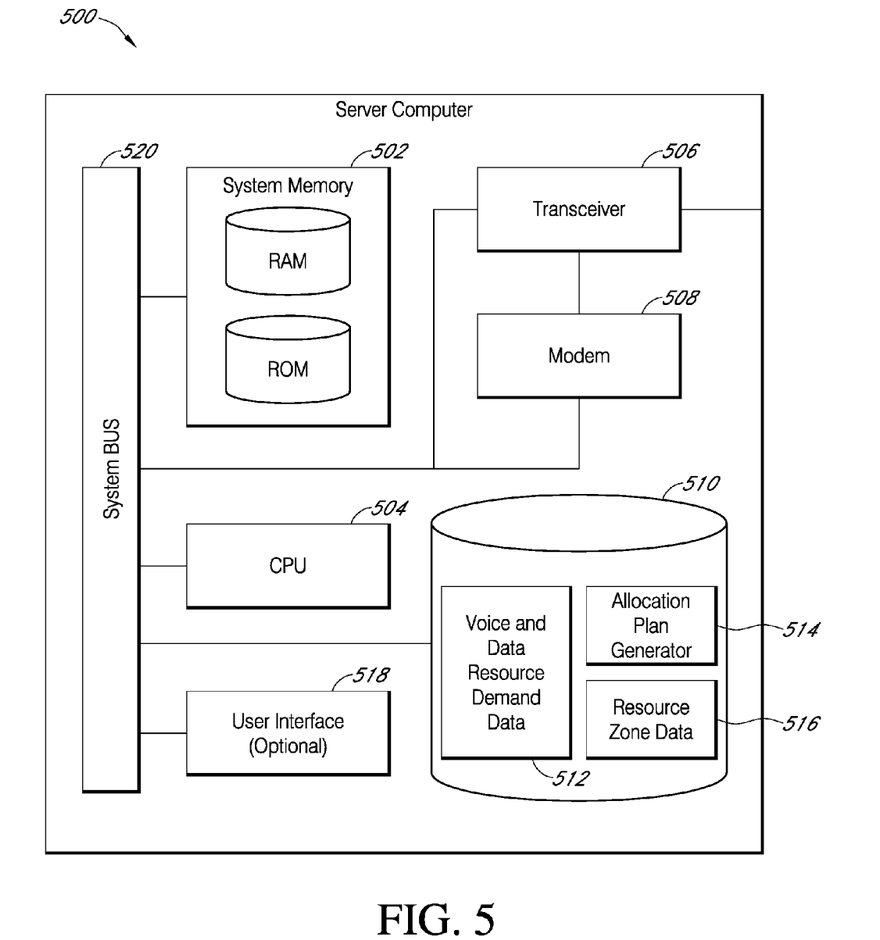
FIG. 5 illustrates a block diagram view of a server computer in accordance with an embodiment of the present invention.

FIG. 5 illustrates a block diagram view of a server computer 500 that may be representative of any of the remote service provider devices 304a-c or the base station 306a in FIG. 3, any one of the server computers in networks 202, 204 and 206 in FIG. 2, or any other common network device known in the art such as a router, gateway, or switch device. The server computer 500 may include, but is not limited to, one or more processor devices including a central processing unit (CPU) 504. In an embodiment, the CPU 504 may include an arithmetic logic unit (ALU, not shown) that performs arithmetic and logical operations and one or more control units (CUs, not shown) that extracts instructions and stored content from memory and then executes and/or processes them, calling on the ALU when necessary during program execution. The CPU 504 is responsible for executing all computer programs stored on the server computer's 500 volatile (RAM), nonvolatile (ROM), and long-term storage system memories, 502 and 510.

The server computer 500 may also include, but is not limited to, an optional user interface 518 that allows a server administrator to interact with the server computer's 500 software and hardware resources and to display the performance and operation of the networked computing system 300; a software/database repository 510 including: voice and data resource demand data 512 that may include a listing of registered transceiver devices (e.g., any of 102a, 104a, 106a, 108a, 110a, 208a, 210a, 306a, 316a, and 400) as well as their historical and/or instantaneous voice traffic and data traffic requirements; resource zone data 516 that may include instantaneous and/or historical resource zones as well as situational factors; and an allocation plan generator 514 for generating a resource allocation plan (e.g., resource allocation plan 900 in FIG. 9) including a voice resource zone and a data resource zone. Further, the server computer 500 may also include a modem 508 for formatting data communications prior to transfer; a transceiver 506 for transmitting and receiving network communications amongst various network base stations, user equipment, and computing devices utilizing the data communication network 302 of the networked computing system 300; and a system bus 520 that facilitates data communications amongst all the hardware resources of the server computer 500.

Figure 6:
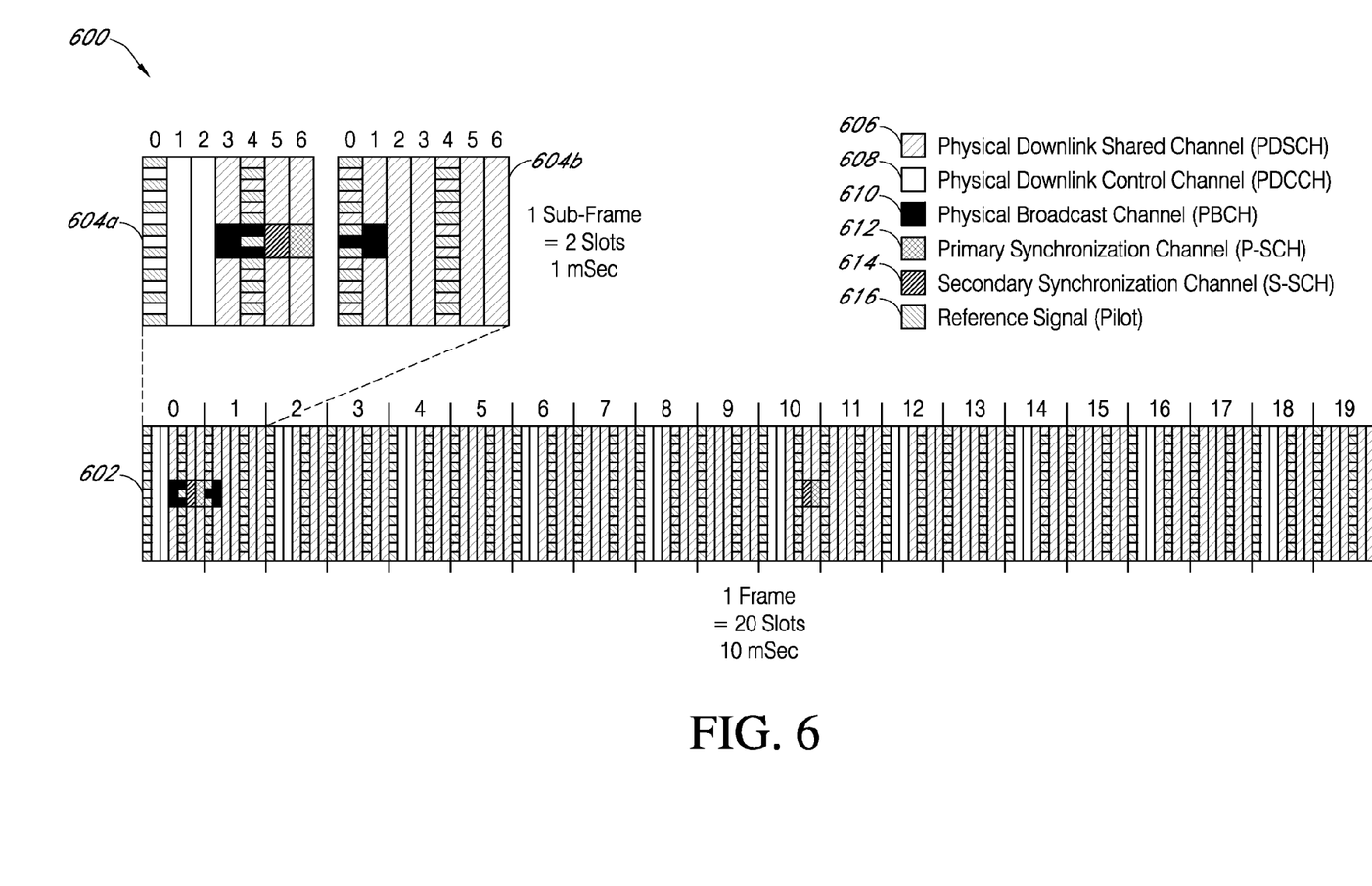
FIG. 6 illustrates a downlink traffic channel used by an embodiment of the present invention.

FIG. 6 illustrates generally a downlink traffic channel 600 used by an embodiment of the present invention. More specifically, FIG. 6 represents a time domain representation of orthogonal frequency-division multiplexing (OFDM) resources for a 3GPP LTE (Third Generation Partnership Project Long Term Evolution) downlink channel. The downlink traffic channel 600 is comprised of several channels combined to form a downlink transmission from a base station 400 to a subscriber device (e.g., 308a-c, 318, 320, and 322). One frame 602 of the downlink traffic channel 600 is comprised of 20 slots numbered 0-19, each slot comprising 0.5 mSec of transmission time. One slot of frame 602 can be referenced as slot 602.0, 602.1, . . . , 602.19. Each frame 602 is comprised of 10 sub-frames, while each sub-frame is comprised of 2 slots. One such sub-frame is made up of a first slot 604a and a second slot 604b. Slots 604a and 604b are further divided into OFDM symbols which are serial in time. These OFDM symbols are numbered 0-6, respectively, for each slot 604a and 604b, while each symbol in each slot can be reference as 604a.0, 604a.1, . . . , 604a.6 and 604b.0, 604b.1, . . . , 604b.6. The vertical dimension of a symbol represents a frequency spectrum.

By way of example, the downlink traffic channel 600 uses six different channels to send data. The physical downlink shared channel (PDSCH) 606 may be used to send common user data and control information (e.g., paging messages) to subscriber devices operating within the coverage area of the base station 400. The physical downlink control channel (PDCCH) 608 is a transmission channel that may be used to transfer control information to mobile devices. The PDCCH 608 defines how the PDSCH 606 is configured and defines uplink transmission scheduling information to help coordinate access control to the base station 400. The PDCCH 608 is usually transmitted as the first symbol of a slot, e.g. symbol 604a.0 of slot 604a, and symbol 604b.0 of slot 604b. Next, the physical broadcast channel (PBCH) 610 is a transmission channel that may be used to transfer information to subscriber devices that are operating within the coverage area of the base station 400. The PBCH 610 may periodically send system identification and access control parameters. The primary synchronization channel (P-SCH) 612 and the secondary synchronization channel (S-SCH) 614 may be used to inform subscriber devices of the current cell timing and scrambling code. The reference signal (Pilot) 616 may carry the cell identity.

Figure 7:
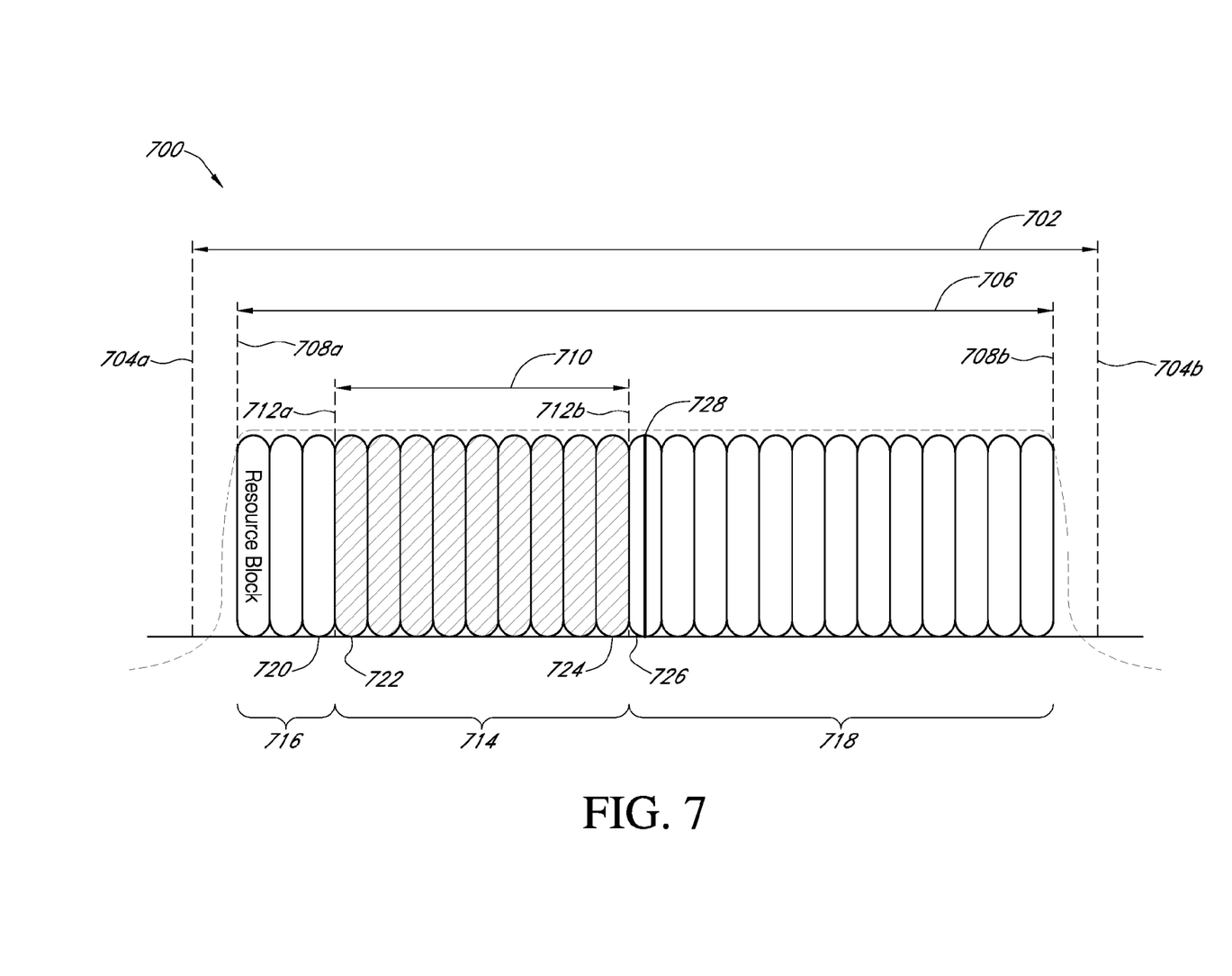
FIG. 7 illustrates a diagram of frequency resources in a wireless transmission in accordance with an embodiment of the present invention.

FIG. 7 illustrates a diagram of frequency resources 700 in a wireless transmission in accordance with an embodiment of the present invention. More specifically, the frequency resources 700 are associated with a 3GPP LTE uplink or downlink communication channel that may be affiliated with various embodiments of the present invention. The frequency resources diagram 700 represents a single radio channel having a set channel bandwidth 702 (e.g., measured in MHz). The channel bandwidth 702 is bordered on both sides by channel edges 704a and 704b. To prevent losing channel edge data communications in the frequency domain (i.e., to prevent losing resource blocks located too close to the channel edges 704a and 704b), data communications in the frequency domain are typically restricted to a reliable transmission bandwidth configuration 706 (bordered by transmission bandwidth configuration edges 708a and 708b) that is smaller than the channel bandwidth 702. This is intended to prevent lossy or degraded data communications. Within the transmission bandwidth configuration 706, only a portion of the available resource blocks may be in use during uplink communications (e.g., communications from a subscriber device to a base station). These resource blocks are known as active resource blocks 714 and they are part of an actual transmission bandwidth 710. The transmission bandwidth 710 is bordered by transmission bandwidth edges 712a and 712b. The remaining resource blocks (e.g., resource block groups 716 and 718) that are not used in a data communication are considered inactive resource blocks (i.e., all resource blocks falling within the transmission bandwidth configuration 706 that are not active resource blocks 714).

The present invention may be implemented on a network level. Accordingly, active resource blocks 714 and inactive resource block groups 716 and 718 may be utilized by any of a macrocell, microcell, picocell, and femtocell. In the active resource blocks 714, resource block 722 shares an edge with resource block 720, which is located in the resource block group 716. Further, resource block 724 shares an edge with resource block 726, which is located in the resource block group 718. As will be discussed shortly, concurrent transmissions of voice traffic and data traffic in the same frequency resource 700 can cause interference levels amongst these edge resource blocks and/or within a resource block group 714, 716, and 718.

Frequency resources 700 may represent either an uplink channel or a downlink channel. In a downlink transmission, frequency resources 700 include a DC carrier 728 that is a component of the LTE downlink waveform resulting from the real-world implementation of an Orthogonal Frequency-Division Multiplexing (OFDM) transmitter. In some transmitter implementations the output of a Inverse Fast Fourier Transform (IFFT) is imposed on a DC level in order to feed the resulting signal into a frequency converter which results in a DC component being added to the transmitted OFDM signal, causing the DC carrier 728 artifact.

It should be understood that the frame structure 600 associated with 3GPP LTE downlink communications as well as the frequency resources 700 associated with 3GPP LTE downlink and uplink communications are solely intended to provide background information for how communications resources may be represented within a frequency domain and time domain (i.e., channel) structure. As discussed herein, other common communications technologies associated with GSM, WiMAX, and UMTS networks are also contemplated as vehicles for carrying out any of the ancillary communication processes associated with various embodiments of the present invention. As such, any LTE based embodiments disclosed herein should not be interpreted to limit the scope of the invention to LTE technology. Instead, these embodiments should be viewed as optional network technology embodiments for carrying out the ancillary communication processes associated with the present invention. Similarly there may be GSM, WiMAX, and UMTS-based embodiments where the same inventive processes may be achieved utilizing the inherent technologies associated with these different communications technology types.

Figure 8:
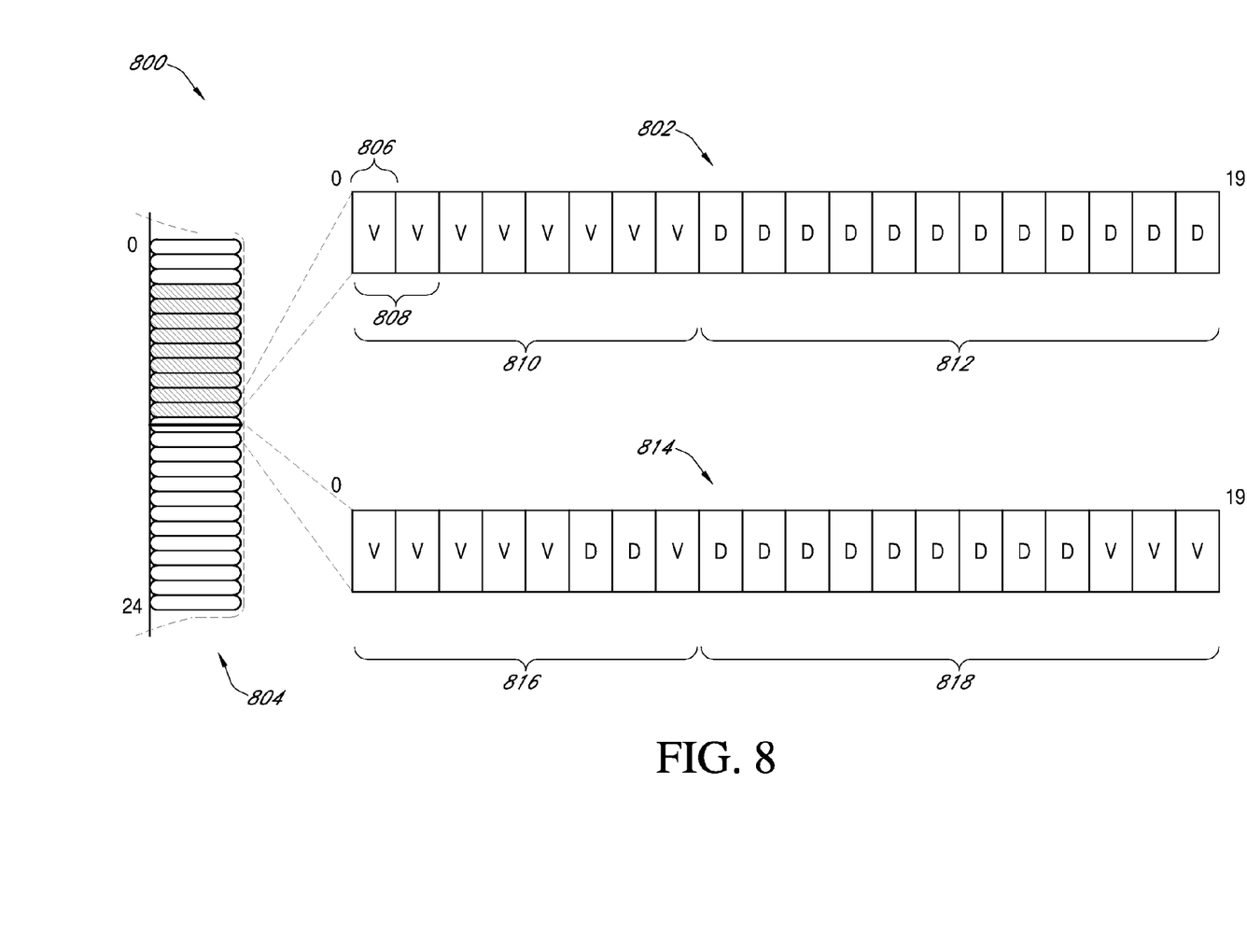
FIG. 8 illustrates a diagram of a frame structure allocation in an airlink resource in accordance with an embodiment of the present invention.

FIG. 8 illustrates a diagram of a frame structure allocation 800 in an airlink resource according to an embodiment of the present invention. In general, the frame structure allocation 800 illustrates the relationship between a simplified time domain frame structure of FIG. 6 and the frequency resources in FIG. 7, as well as one example of traffic segregation. In one embodiment, an airlink resource may be considered to be a frequency resource 700, an individual resource block 722, or a resource block group 714. By way of example, frequency resource 804 generally depicts a frequency resource 700 of FIG. 7. In this example the frequency resource 804 has 25 resource blocks, ranging from 0-24. Time resource 802 is an abstract representation of a time resource (e.g., a time domain frame 602) transmitting at particular frequency of frequency resource 804. Time resource 814 is also an abstract representation of a time resource transmitting at a particular frequency distinct from time resource 802.

In time resource 802, the first subframe 808 comprises a first voice traffic slot 806. Time resource 802 may comprise 20 slots, ranging from 0-19. In this example, only voice data (i.e., voice traffic) is transmitted in a first resource zone 810 while only web data (i.e., data traffic) is transmitted in a second resource zone 812. A first transceiver device (e.g., 102a, 104a, 106a, 108a, 110a, 208a, 210a, 306a, 316a, and 400) may be transmitting time resource 802. By way of example, time resource 814 may be simultaneously transmitted by a second transceiver device which is sharing the frequency resources 804. Unlike time resource 802, time resource 814 has a heterogeneous mixture of voice traffic and data traffic in both resource zones 816 and 818.

Without proper management, data traffic may cause interference with voice traffic transmitted in a frequency resource 804. For example, as the second transceiver transmits the last three voice traffic blocks in resource zone 818, the first transceiver is transmitting data traffic blocks. The data traffic may cause interference in the voice traffic blocks, and this may reduce a Quality of Experience (QOE) and/or a Quality of Service (QOS). Thus a resource allocation plan is needed to manage the transmission of voice traffic and data traffic.

Figure 9:
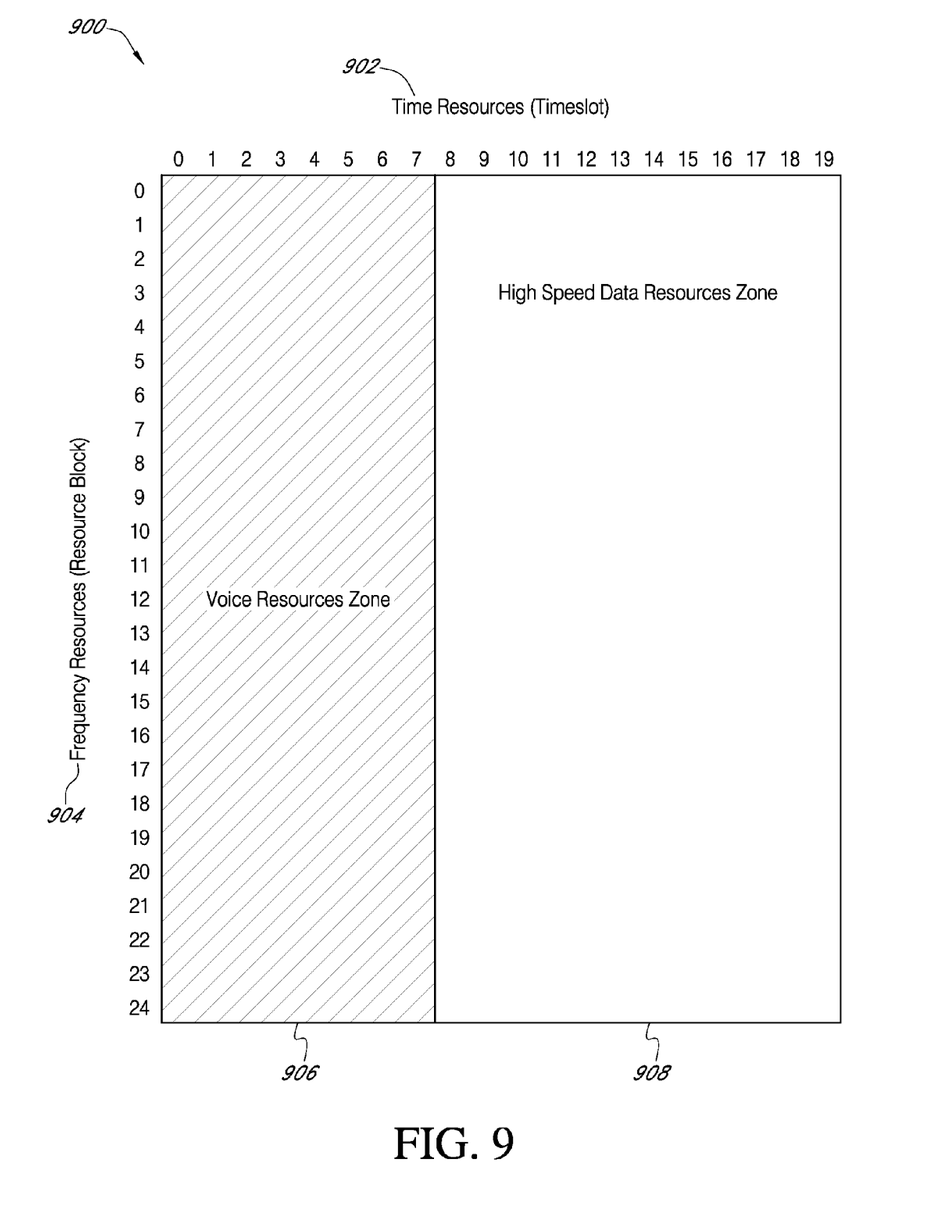
FIG. 9 illustrates an allocation plan with a voice resource zone and a data resource zone in accordance with an embodiment of the present invention.

FIG. 9 illustrates an allocation plan 900 with a voice resource zone 906 and a data resource zone 908 according to an embodiment of the present invention. The allocation plan 900 considers both the frequency resources 904, in units of resource blocks, and time resources 902, in units of timeslots. Although the voice resource zone 906 is shown as occupying the first timeslots in the time resources, in one embodiment the data resource zone 908 may be allocated to the first timeslots, followed by the voice resource zone 906 in the remaining timeslots. Alternatively, the allocation plan may divide the frequency resources rather than the time resources, allocating a first portion of the frequency resources for the entire time resource to voice traffic and a second portion of frequency resources for the entire time resource to data traffic.

By way of example, a voice resource zone 906 in allocation plan 900 spans frequency blocks 0-24 for the first eight time slots (e.g., 0-7). All the traffic sent in this zone will be voice traffic, and as such the traffic can be optimally managed for peak efficiency. Without data traffic transmitted in voice resource zone 906, data traffic will not interfere with the voice traffic. Data traffic is instead sent in the data resource zone 908 which spans the frequency blocks 0-24 for the remaining timeslots of the time resources (e.g., for the remaining timeslots 8-19). Grouping the data traffic together by traffic type does not present the same interference problems associated with concurrent transmissions of voice traffic and data traffic because power control algorithms may control the voice traffic while data traffic is not as sensitive to delay and any errors may be corrected with retransmissions.

An allocation plan 900 may be generated dynamically based on the actual network traffic demand. In a simple example, a first transceiver device (e.g., 108a) may have an resource demand of 50% voice traffic and 50% data traffic while a second transceiver device (e.g., 106a) may be operating below full capacity and may only require a 50% load of data traffic. Rather than allocating the airlink resources in an ad hoc manner which may result in interference between the voice traffic and data traffic, the first and second transceiver devices may consider resource demand information and generate an allocation plan by which the data traffic of both transceiver devices is sent in the same data resource zone. As a result, the voice traffic would be transmitted without interference.

Figure 10:
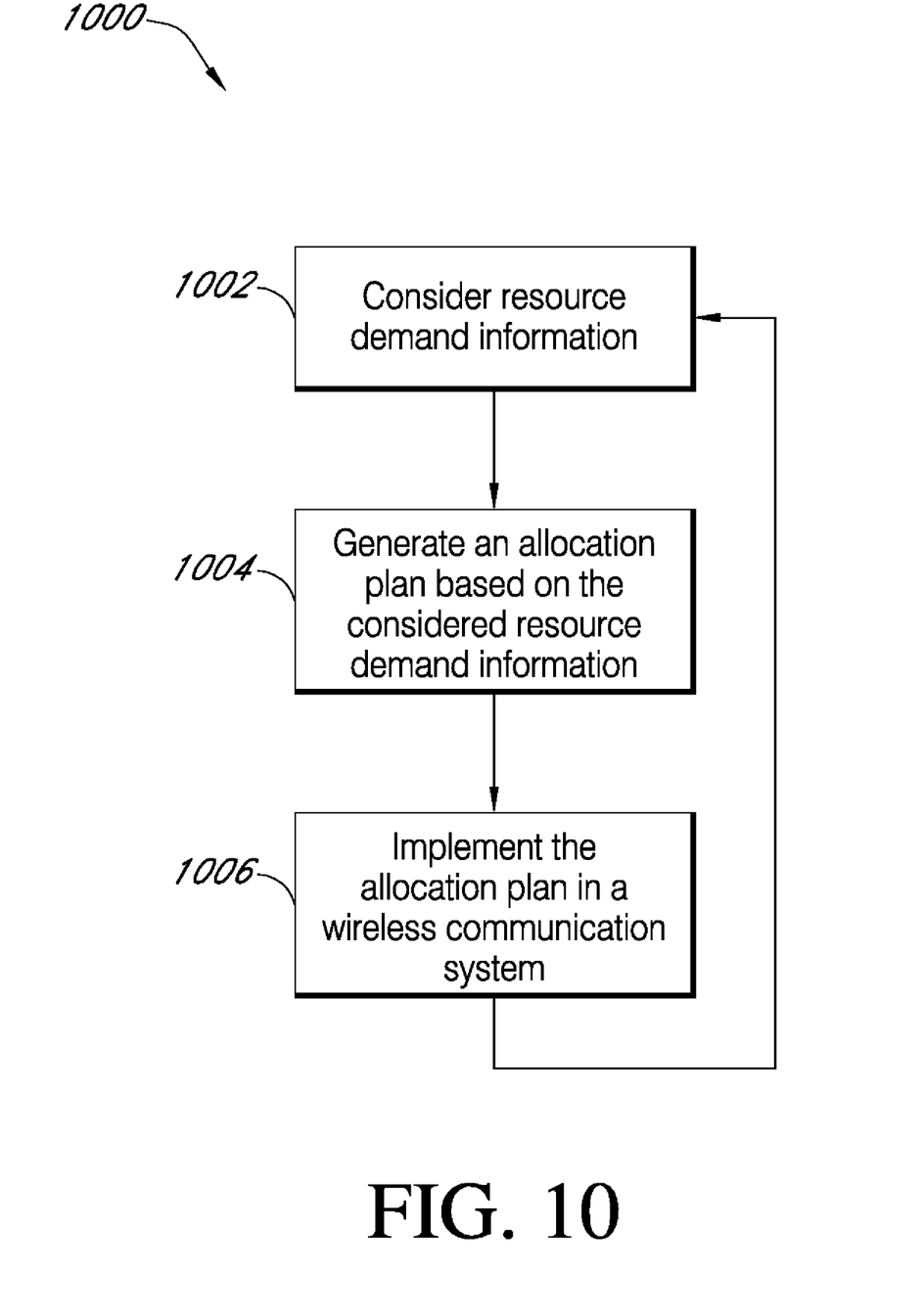
FIG. 10 illustrates a flow diagram depicting processes for generating and implementing a resource allocation plan in accordance with an embodiment of the present invention.

FIG. 10 illustrates a flow diagram 1000 depicting processes for generating and implementing a resource allocation plan according to an embodiment of the present invention. It should be understood that this process 1000 could be executed using one or more computer-executable programs stored on one or more computer-readable media located on any one of the base station devices (e.g., 104a, 106a, 108a, 110a, 208a, 210a, 316a, and 400), or collaboratively on the network base station 102a or 306a, the group of remote service provider devices 304a-c, or on any other common service provider device known in the Art of FIGS. 1-5. At block 1002, resource demand information regarding various devices on the network is considered. In this context, considering may include, but is not limited to: anticipating a resource demand information based on components in the network; estimating a resource demand information based on historical data; and sharing resource demand information. Sharing resource demand information may further include, but is not limited to: sending or receiving resource demand information between transceiver devices (e.g., 102a, 104a, 106a, 108a, 110a, 208a, 210a, 306a, 316a, and 400); and sending or receiving resource demand information between transceiver devices and a server computer (e.g., servers in the EPC network 204, 304a-c, and 500). Resource demand information may be shared using a variety of communication means, including but not limited to: an X2 interface between transceiver devices; an Si interface between a transceiver device and a server computer; and via an IP based network (e.g., 302). Additionally, resource demand information may include, but is not limited to: a voice resource demand; a data resource demand; instantaneous resource demands; historical resource demands; a resource demand for a single transceiver; and resource demand information for multiple transceiver devices.

Next, at block 1004 an allocation plan based on the considered resource demand information is generated. This allocation plan may be representative of allocation plan 900 in FIG. 9. Additionally, either a transceiver device (e.g., 102a, 104a, 106a, 108a, 110a, 208a, 210a, 306a, 316a, and 400) or a server computer (e.g., servers in the EPC network 204, 304a-c, and 500) may generate an allocation plan in accordance with an embodiment of the present invention. In one embodiment, server computer 500 generates an allocation plan by pre-provisioning portions of a frequency resource for voice traffic and data traffic. In another embodiment, server computer 500 generates an allocation plan by receiving the resource demand information and storing the information in memory 512. The server 500 may compare the received resource demand information with current or historical resource zone data stored in memory 516 as part of a generation algorithm. The allocation generator 514 may analyze the received resource demand information, synthesize the data, balance competing demands, and generate an allocation plan. Although the details of each resource allocation plan will vary according to a demand, an allocation plan will generally coordinate the airlink resources such that all cells (i.e., transceiver devices 102a, 104a, 106a, 108a, 110a, 208a, 210a, 306a, 316a, and 400) use similar sets of resources (e.g., a voice resource zone 906 and a data resource zone 908) to reduce interference levels (e.g., a signal-to-interference-plus-noise (SINR) level). Within the defined voice resource zones and data resource zones, different transceiver devices that consider or share the set of airlink resources will utilize different parts of each zone as allowed by interference and as required by throughput needs. Therefore the traffic in the zones is dynamic but confined to the particular zone. Finally, the zones themselves are dynamic according to system needs (e.g., a data resource zone size will increase if the overall data traffic requests in the system increases). In an alternate embodiment, the resource zones may be statically pre-provisioned based upon the considered resource demand information.

Although the allocation plan has been discussed as simply segregating voice traffic and data traffic into respective voice resource zones and data traffic zones, alternate embodiments of the allocation plan may involve more complex management of resources. By way of example, a server computer (e.g., 500) may have received a complete resource demand information for cells in a network with overlapping coverage areas (e.g., transceiver devices 108*a* and 104*a* with corresponding coverage areas 108*b* and 104*b*). The managing server 500 may have established a voice resource zone and a data resource zone but transceiver 108*a* may need to allocate a set of resources for a data session which overlaps the voice resource zone in the adjacent transceiver device 104*a*. In this scenario, the managing server 500 may allocate as much traffic as possible to prevent any voice traffic and data traffic interference and then the server 500 may set a transmit power below a threshold so that the level of interference created by the data traffic in the transceiver device 108*a* is not significant enough to degrade the quality of the voice traffic in the transceiver device 104*a*.

In another embodiment, a transceiver device may first determine a resource demand for its associated cell and may generate an allocation plan. Once a voice resource zone and a data traffic zone has been established, the transceiver device may share the allocation plan with neighboring transceiver devices that may cause interference with each other. The transceiver devices that receive this allocation plan may adopt the allocation plan as in a master-slave relationship, or the transceiver devices may amend the plan to suit the demand of its own needs in a collaborative process.

At block 1006 the allocation plan is implemented in a wireless communication system. This step may include, but is not limited to: transmitting the allocation plan from the location of the allocation plan generator to a transceiver; setting the resource zone sizes within each transceiver; and wirelessly communicating according to the allocation plan. Finally, this process 1000 may run continuously, at any time unit, or at any event interval to dynamically generate and implement an allocation plan based on actual demand and traffic types.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A wireless communication system an comprising:
   a first base station using a first airlink resource;
   a second base station using a second airlink resource;
   at least one user equipment;
   a server computer; and
   a data communication network facilitating data communication amongst the first base station, the second base station, the at least one user equipment, and the server computer,
   wherein the system is configured to:
   consider resource demand information including a first voice traffic demand and a first data traffic demand of the first base station and a second voice traffic demand and a second data traffic demand of the second base station;
   generate an allocation plan by separating the first airlink resource into a first voice resource zone and a first data resource zone based on the considered resource demand information, each of the first voice resource zone and the first data resource zone being defined in terms of a frequency resource and a time resource; and
   implement the allocation plan in the wireless communication system,
   wherein the device the allocation plan separates the second airlink resource into a second voice resource zone and a second data resource zone based on the considered resource demand information, each of the second voice resource zone and the second data resource zone being defined in terms of a frequency resource and a time resource.

2. The system of claim 1, wherein a size of the first voice resource zone and a size of the first data resource zone varies dynamically according to the considered resource demand, and
   wherein the first voice resource zone is defined by dividing the frequency resource or the time resource, or both.

3. The system of claim 1, wherein the frequency resource includes a plurality of frequency blocks and the time resource includes a plurality of timeslots,
   wherein the first voice resource zone comprises all of the frequency blocks of the frequency resource and a first portion of the timeslots of the time resource,
   wherein the first data resource zone comprises all of the frequency blocks of the frequency resource and a second portion of the timeslots of the time resource, and
   wherein the first portion of the timeslots and the second portion of the timeslots are different timeslots, so that the allocation plan reduces an interference level between voice communication traffic and data communication traffic.

4. The system of claim 1, wherein the frequency resource includes a plurality of frequency blocks and the time resource includes a plurality of timeslots,
   wherein the first voice resource zone comprises a first portion of the frequency blocks of the frequency resource and a first portion of the timeslots of the time resource,
   wherein the first data resource zone comprises a second portion of the frequency blocks of the frequency resource and a second portion of the timeslots of the time resource, and
   wherein the first portion of the frequency blocks and the second portion of the frequency blocks are different frequency blocks, or the first portion of the timeslots and the second portion of the timeslots are different timeslots, or both, so that the allocation plan reduces an interference level between voice communication traffic and data communication traffic.

5. The system of claim 1, wherein the first voice resource zone and the first data resource zone are defined by dividing the frequency resource into first and second different frequency resource portions, or dividing the time resource into first and second different time resource portions, or both.

6. The system of claim 1, wherein considering the resource demand information comprises:
   transmitting a first resource demand information of the first base station to the server computer; and
   transmitting a second resource demand information of the second base station to the server computer.

7. A non-transitory computer-implemented method for managing an-a wireless communication system including a first base station that uses a first airlink resource and a second base station that uses a second airlink resource, the computer-implemented method comprising:
   considering resource demand information including a first voice traffic demand and a first data traffic demand of the first base station and a second voice traffic demand and a second data traffic demand of the second base station;

generating an allocation plan by separating the first airlink resource into a first voice resource zone and a first data resource zone based on the considered resource demand information, each of the first voice resource zone and the first data resource zone being defined in terms of a frequency resource and a time resource; and implementing the allocation plan in the wireless communication system, wherein the allocation plan separates the second airlink resource into a second voice resource zone and a second data resource zone based on the considered resource demand information, each of the second voice resource zone and the second data resource zone being defined in terms of a frequency resource and a time resource.

8. The non-transitory computer-implemented method of claim 7, wherein a size of the first voice resource zone and a size of the first data resource zone varies dynamically according to the considered resource demand and wherein the first voice resource zone is defined by dividing the frequency resource or the time resource, or both.

9. The non-transitory computer-implemented method of claim 7, wherein resource the frequency resource includes a plurality of frequency blocks and the time resource includes a plurality of timeslots, wherein the first voice resource zone comprises all of the frequency blocks of the frequency resource and a first portion of the timeslots of the time resource, and wherein the first data resource zone comprises all of the frequency blocks of the frequency resources and a second portion of the timeslots of the time resource, and wherein the first portion of the timeslots and the second portion of the timeslots are different timeslots, so that the allocation plan reduces an interference level between voice communication traffic and data communication traffic.

10. The non-transitory computer-implemented method of claim 7, wherein the frequency resource includes a plurality of frequency blocks and the time resource includes a plurality of timeslots, wherein the first voice resource zone comprises a first portion of the frequency blocks of the frequency resource and a first portion of the timeslots of the time resource, wherein the first data resource zone comprises a second portion of the frequency blocks of the frequency resource and a second portion of the timeslots of the time resource, and wherein the first portion of the frequency blocks and the second portion of the frequency blocks are different frequency blocks, or the first portion of the timeslots and the second portion of the timeslots are different timeslots, or both, so that the allocation plan reduces an interference level between voice communication traffic and data communication traffic.

11. The non-transitory computer-implemented method of claim 7, wherein the first voice resource zone and the first data resource zone are defined by dividing the frequency resource into first and second different frequency resource portions, or dividing the time resource into first and second different time resource portions, or both.

12. A non-transitory computer readable medium encoded with computer-executable instructions for managing a wireless communication system including a first base station that uses a first airlink resource and a second base station that uses a second airlink resource, the non-transitory computer readable medium, when executed, performs a method comprising:

considering resource demand information including a first voice traffic demand and a second data traffic demand of the first base station and a second voice traffic demand and a second data traffic demand of the second base station;

generating an allocation plan by separating the first airlink resource into a first voice resource zone and a first data resource zone based on the considered resource demand information, each of the first voice resource zone and the first data resource zone being defined in terms of a frequency resource and a time resource; and implementing the allocation plan in the wireless communication system, wherein the allocation plan separates the second airlink resource into a second voice resource zone and a second data resource zone based on the considered resource demand information, each of the second voice resource zone and the second data resource zone being defined in terms of a frequency resource and a time resource.

13. The computer readable medium of claim 12, wherein a size of the first voice resource zone and a size of the first data resource zone varies dynamically according to the considered resource demand, and wherein the first voice resource zone is defined by dividing the frequency resource or the time resource, or both.

14. The computer readable medium of claim 12, wherein the frequency resource includes a plurality of frequency blocks and the time resource includes a plurality of timeslots, wherein the first voice resource zone comprises all of the frequency blocks of the frequency resource and a first portion of the timeslots of time resource, and wherein the first data resource zone comprises all of the frequency blocks of the frequency resource and a second portion of the timeslots of the time resource, and wherein the first portion of the timeslots and the second portion of the timeslots are different timeslots, so that the allocation plan reduces an interference level between voice communication traffic and data communication traffic.

15. The computer readable medium of claim 12, wherein the frequency resource includes a plurality of frequency blocks and the time resource includes a plurality of timeslots, wherein the first voice resource zone comprises a first portion of the frequency blocks of the frequency resource and a first portion of the timeslots of the time resource, wherein the first data resource zone comprises a second portion of the frequency blocks of the frequency resource and a second portion of the timeslots of the time resource, and wherein the first portion of the frequency blocks and the second portion of the frequency blocks are different frequency blocks, or the first portion of the timeslots and the second portion of the timeslots are different timeslots, or both, so that the allocation plan reduces an interference level between voice communication traffic and data communication traffic.

16. The computer readable medium of claim 12, wherein the first voice resource zone and the first data resource zone are defined by dividing the frequency resource into first and second different frequency resource portions, or dividing the time resource into first and second different time resource portions, or both.

17. A base station an for wireless communications, comprising:

at least one memory; and at least one processor operatively coupled to the at least one memory, wherein the base station is configured to:

consider resource demand information including a voice traffic demand and a data traffic demand;

generate an allocation plan by separating the airlink resource into a voice resource zone and a data resource zone based on the consider resource demand information, each of the voice resource zone and the data resource zone being defined in terms of a frequency resource and a time resource; and implement the allocation plan in a wireless communication system, wherein the device the allocation plan separates the second airlink resource into a second voice resource zone and a second data resource zone based on the considered resource demand information, each of the second voice resource zone and the second data resource zone being defined in terms of a frequency resource and a time resource.

* * * * *